United States Patent
Yang

(10) Patent No.: US 8,660,422 B2
(45) Date of Patent: Feb. 25, 2014

(54) COMBINED COMMUNICATION AND BROADCASTING DUAL SWITCHING SYSTEM AND METHOD

(75) Inventor: Shin Hak Yang, Gwacheon-si (KR)

(73) Assignee: Ubiquoss Inc. (KR)

( * ) Notice: Subject to any disclaimer, the term of this patent is extended or adjusted under 35 U.S.C. 154(b) by 8 days.

(21) Appl. No.: 13/523,280

(22) Filed: Jun. 14, 2012

(65) Prior Publication Data

US 2012/0321304 A1    Dec. 20, 2012

(30) Foreign Application Priority Data

Jun. 16, 2011 (KR) ................. 10-2011-0058594

(51) Int. Cl.
| | |
|---|---|
| *G02F 1/00* | (2006.01) |
| *G02F 2/00* | (2006.01) |
| *H01S 3/00* | (2006.01) |
| *H04B 10/00* | (2013.01) |
| *H04J 14/00* | (2006.01) |

(52) U.S. Cl.
USPC ............... 398/5; 398/1; 398/43; 398/70

(58) Field of Classification Search
CPC ............ H04B 10/25751; H04B 10/03; H04B 10/032; H04J 14/0289
USPC ............... 398/1, 2, 5, 7, 9, 10, 16, 19, 21, 45, 398/55–57, 66, 68, 70, 71, 115, 145
See application file for complete search history.

(56) References Cited

U.S. PATENT DOCUMENTS

| | | | |
|---|---|---|---|
| 2005/0025485 A1* | 2/2005 | Lee et al. ................. | 398/71 |
| 2009/0067835 A1* | 3/2009 | Chen ...................... | 398/45 |
| 2010/0021164 A1* | 1/2010 | Luk et al. ................. | 398/72 |
| 2012/0134663 A1* | 5/2012 | Wang et al. .............. | 398/5 |

* cited by examiner

*Primary Examiner* — Leslie Pascal
*Assistant Examiner* — Casey Kretzer
(74) *Attorney, Agent, or Firm* — Levenfeld Pearlstein, LLC

(57) ABSTRACT

Disclosed herein are a combined communication and broadcasting dual switching system and method. The system includes broadcasting transmission means, an Optical Line Terminal (OLT), an optical detection unit, an active path determination unit, an optical switch unit, and a combining unit. The broadcasting transmission means converts a Radio Frequency (RF) broadcast signal into an optical signal. The OLT includes dual lines and selectively outputs an Internet data signal. The optical detection unit detects a line from which the Internet data signal is being output. The active path determination unit determines that the line is an active path. The optical switch unit receives the optical signal from the broadcasting transmission means, and switches to the active path. The combining unit receives the optical signal output after having been switched, receives the Internet data signal from the OLT, and multiplexes the received optical signal and the received Internet data signal.

13 Claims, 4 Drawing Sheets

COMBINED COMMUNICATION AND BROADCASTING DUAL SWITCHING SYSTEM AND METHOD

CROSS REFERENCE TO RELATED APPLICATION

The present application claims priority from Korean Patent Application Number 10-2011-0058594 filed on Jun. 16, 2011, the entire contents of which application are incorporated herein for all purposes by this reference.

BACKGROUND OF THE INVENTION

1. Field of the Invention

The present invention relates generally to a combined communication and broadcasting dual switching system and method and, more particularly, to combined communication and broadcasting dual switching system and method in which dual lines are configured between an Optical Line Terminal (OLT) and broadcasting transmission means, and an optically converted broadcast signal is automatically switched to the active path of the OLT and then output.

2. Description of the Related Art

Current communication and broadcasting network infrastructures are split into a variety of types of infrastructures. Broadcasting networks have been divided and developed into terrestrial broadcasting networks, CATV networks, and satellite broadcasting networks. Communication networks have been divided and developed into a variety of types of communication networks, including wired and wireless lines, depending on the location of application and performance.

Currently, common home subscribers receive Internet services and Video On Demand (VOD) broadcast services using Personal Computers (PCs) via Internet Service Providers (ISPs), and receives multi-channel broadcast services using terminal means, such as TV sets, directly via a terrestrial broadcasting network, or via a variety of media such as a wired CATV broadcasting network and a satellite broadcasting network using artificial satellites.

Since there are broadcast services using the variety of media, the same subscriber should be equipped with systems suitable for the respective services in order to use the variety of broadcast services. That is, a cable network and a system, such as a CATV STB, are required to use a CATV broadcast service, a separate satellite antenna and a satellite STB need to be provided to use a satellite broadcast service, and an IP DSLAM system, a modem and additional equipment needs to be provided to use VOD services. Since currently broadcasting has not been integrated with communication, the cost of using various services is high, and therefore the burden of use imposed by the services increases.

This type of network structure does not meet the demand of consumers who expect a combined service in which broadcasting and communication have been combined using a current multimedia service-oriented network, and there is an increasing demand and expectation for an integrated network structure which is capable of implementing a combined communication and broadcast service.

For this purpose, a variety of methods are being attempted of providing services using a single transmission line and a single receiver by integrating methods of providing broadcasting and communication services to subscribers using separate transmission channels and receivers from a variety of aspects. Examples of these methods include a method of providing an Internet service over a CATV network and a method of directly connecting xDSL to a TV set, not a PC.

FIG. 1 is a schematic diagram showing a conventional configuration for combining an Internet data signal and a broadcast signal and outputting a combined signal. As shown in FIG. 1, a broadcast signal output from broadcasting transmission means 110 and an Internet data signal output from an OLT 120 are combined by a multiplexer MUX 130, and the Internet and broadcast services are provided via the combined signal using a TV set. This type of development is being actively conducted, and a variety of techniques capable of providing a variety of types of broadcast services using different media over a communication network are being researched also in the field of broadcasting services.

SUMMARY OF THE INVENTION

Accordingly, the present invention has been made keeping in mind the above problems occurring in the prior art, and an object of the present invention is to provide a combined communication and broadcasting dual switching system and method in which dual lines are configured between the OLT and broadcasting transmission means, and an optically converted broadcast signal is automatically switched to the active path of an OLT and then output.

The objects of the present invention are not limited to the above-described object, and other objects that have not been described above will be apparent to those skilled in the art from the following description.

In order to achieve the above object, the present invention provides a combined communication and broadcasting dual switching system, including broadcasting transmission means configured to convert a Radio Frequency (RF) broadcast signal into an optical signal, and to output the optical signal; an Optical Line Terminal (OLT) configured to include dual lines, and selectively output an Internet data signal; an optical detection unit configured to detect a line from which the Internet data signal is being output, from among the dual lines of the OLT; an active path determination unit configured to determine that the line, detected by the optical detection unit, is an active path, and output a switching control signal; an optical switch unit configured to receive the optical signal from the broadcasting transmission means, and switch to the active path in response to the switching control signal output from the active path determination unit; and a combining unit configured to receive the optical signal output after having been switched by the optical switch unit, receive the Internet data signal from the OLT, multiplex the received optical signal and the received Internet data signal, and output a multiplexed signal.

The optical detection unit may include a first photodiode and a second photodiode, and the first photodiode and the second photodiode may be connected to the respective dual lines of the OLT and detect the line from which the Internet data signal is being output by receiving light of the line from which the Internet data signal is being output.

The broadcasting transmission means may include an RF amplification unit for amplifying the RF broadcast signal based on a frequency band and outputting the amplified RF signal; and an Electrical to Optical (E/O) conversion unit for converting the RF signal of the RF amplification unit into the optical signal.

The combining unit may include a first multiplexer (MUX) and a second MUX, the first MUX and the second MUX may be connected to the respective dual lines of the OLT, and the first MUX or the second MUX connected to the line of the active path may receive the Internet data signal and the optical signal output after having been switched, multiplex the Internet data signal and the optical signal, and output the multiplexed signal.

The RF broadcast signal may include a satellite broadcast signal and a CATV broadcast signal.

The Internet data signal output from the dual lines of the OLT may be selectively output in response to a dual switching control signal.

In order to achieve the above object, the present invention provides a combined communication and broadcasting dual switching method, including detecting a line from which an Internet data signal is being output, from among dual lines of an Optical Line Terminal (OLT); determining that the detected line is an active path, and outputting a switching control signal; receiving a broadcast signal, switching to the active path in response to the switching control signal, and outputting a broadcast signal; and receiving the broadcast signal and the Internet data signal, multiplexing the broadcast signal and the Internet data signal, and outputting the multiplexed signal.

The detecting a line from which an Internet data signal is being output may include detecting light using a photodiode.

The broadcast signal may be output as an optical signal which is obtained by performing E/O conversion on an RF-amplified signal.

The broadcast signal may include a satellite broadcast signal and a CATV broadcast signal.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
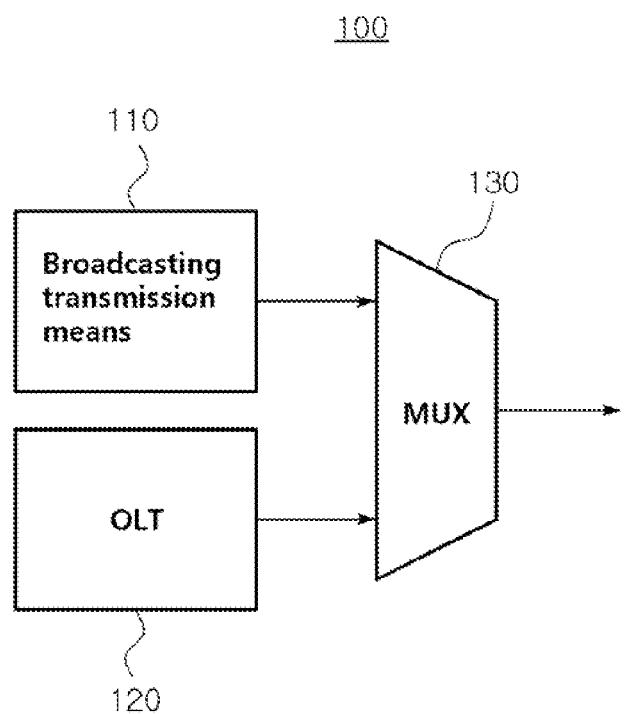
FIG. 1 is a schematic diagram showing a conventional configuration for combining an Internet data signal and a broadcast signal and outputting a combined signal.

Preferred embodiments of the present invention which can be readily practiced by those skilled in the art will be described in detail below with reference to the accompanying drawings. In the following description of the operational principles of the preferred embodiments of the present invention, if it is determined that detailed descriptions of related well-known functions or configurations would make the gist of the present invention unnecessarily obscure, the detailed descriptions will be omitted.

Furthermore, the same reference numerals are used throughout the drawings to designate elements having similar functions and operations.

In addition, throughout the specification, when one element is described as being "coupled (or connected)" to another element, the one element may be "directly coupled (or connected)" to the other element or "indirectly coupled (or connected)" to the other element by way of a third element. Furthermore, the term "includes (or comprises) one element" does not mean "excludes another element" but rather means "may include another element" unless described otherwise.

An embodiment of the present invention will now be described in detail with reference to the accompanying drawings.

Figure 2:
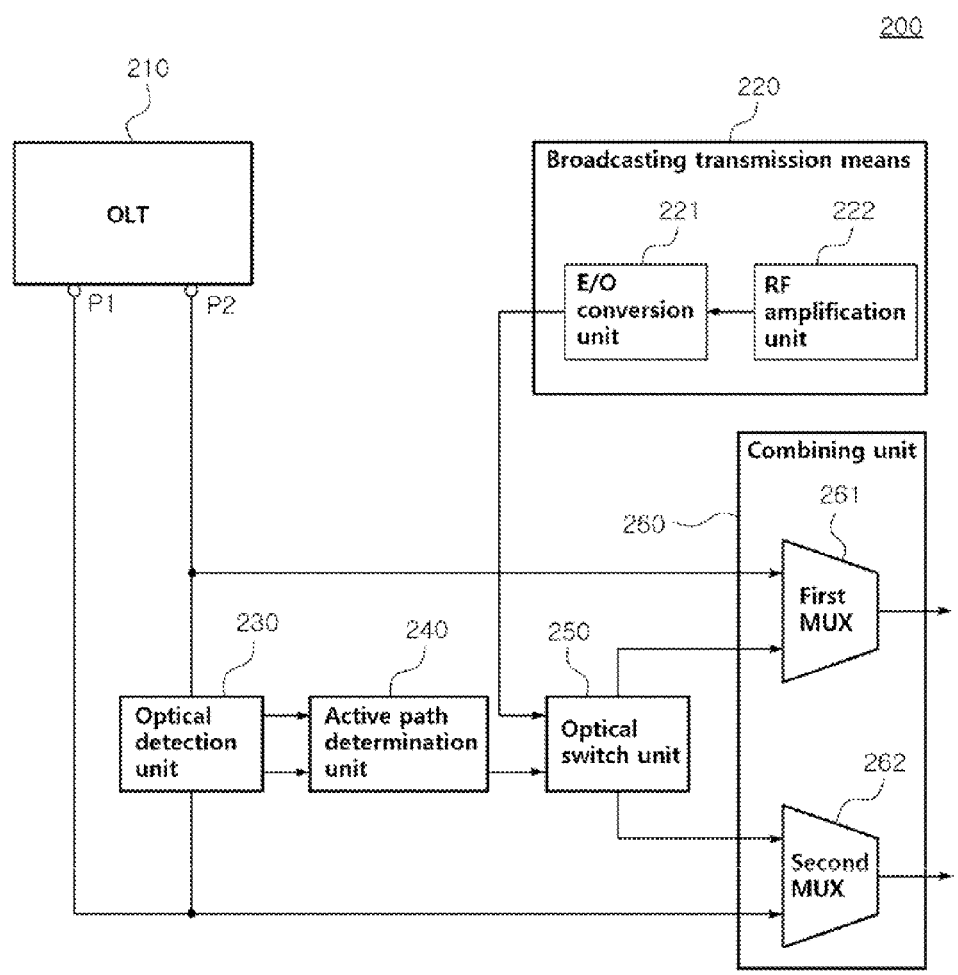
FIG. 2 is a schematic diagram showing the configuration of a combined communication and broadcasting dual switching system according to the present invention.

FIG. 2 is a schematic diagram showing the configuration of a combined communication and broadcasting dual switching system according to the present invention. As shown in FIG. 2, the combined communication and broadcasting dual switching system according to the present invention includes an OLT 210, broadcasting transmission means 220, an optical detection unit 230, an active path determination unit 240, an optical switch unit 250, and a combining unit 260.

The broadcasting transmission means 220 accommodates all types of services, such as satellite broadcasting, CATV broadcasting, VOD broadcasting and an Internet service, and distributes the services among subscribers over optical cables.

The broadcasting transmission means 220 includes an RF amplification unit 222 for amplifying an RF broadcast signal based on a frequency band and outputting the amplified RF signal, and an Electrical-to Optical (E/O) conversion unit 221 for converting the RF signal of the RF amplification unit 222 into an optical signal.

Although not shown, it is preferred that the broadcasting transmission means 220 further include, as basic elements, a satellite signal reception function filter unit for receiving and a filtering satellite broadcast signal, a satellite signal RF amplification unit for amplifying the satellite broadcast signal, filtered by the satellite signal reception function filter unit, based on the frequency band from the satellite broadcast signal, a CATV signal reception function filler unit for receiving and filtering a CATV broadcast signal, a CATV signal RF amplification unit for amplifying the CATV broadcast signal, filtered by the CATV signal reception function filter unit, based on the frequency band from the satellite broadcast signals, an RF combining unit for multiplexing the satellite broadcast signal and the CATV broadcast signal amplified by the satellite signal RF amplification unit and the CATV signal RF amplification unit, respectively, and an optical amplifier for amplifying the output of an optical signal obtained by the E/O conversion unit.

In this case, it is preferred that the frequency band of the satellite broadcast signal range from 950 MHz to 2150 MHz and the frequency band of the CATV broadcast signal range from 50 MHz to 870 MHz. Furthermore, it is preferred that the frequency band of the RF signal multiplexed by the RF combining unit range from 50 MHz to 2150 MHz.

Satellite broadcasting and CATV broadcasting are using different frequency bands in the current broadcasting situation. CATV broadcasting uses the frequency band from 50 to 870 MHz, and satellite broadcasting uses the frequency band from 950 to 2150 MHz via an LNB module. Multi-channel broadcasts that serve the two CATV and satellite bands including the two different frequency bands are filtered via the reception function filters, and pass through the RF amplification unit 222 based on the individual frequency bands.

The CATV broadcast signal and the satellite broadcast signal amplified by the RF amplification unit 222 are multiplexed into an RF signal in the frequency band from 50 to 2150 MHz by the RF combining unit. The multiplexed RF signal in the frequency band from 50 to 2150 MHz is converted from an electrical signal to an optical signal by the E/O conversion unit 222.

The optical signal of the broadcast signal integrated and combined as described above may be amplified by the optical amplifier and transmitted over a subscriber network, if desired. Here, the wavelength of an optical signal used for broadcasting and the wavelength of OLT data used for Internet data are different. Although the drawing illustrates an example in which 1550 nm and 1490/1310 nm are used as the wavelengths of an optical signal and OLT data, respectively, different wavelengths may be used.

The OLT 210 includes dual lines P1 and P2m and functions to selectively output an Internet data signal in response to a dual switching control signal and also switch between the dual lines of the broadcasting transmission means 220.

Since the OLT 210 generally performs a communication function, it performs a bi-directional optical communication function. For example, the OLT 210 may perform a data communication function using optical signals at the different wavelengths of 1490 nm and 1310 nm because it performs the bi-directional communication function using a single optical fiber over an E-PON network. In this E-PON network, the OLT 210 performs Internet data communication using the wavelength of 1490 nm as the wavelength of the downstream optical signal (i.e., the output signal of a transmission unit) of data and the wavelength of 1310 nm as the wavelength of an upstream optical signal (i.e., the input signal of the transmission unit).

The OLT 210 is formed of two devices. When one of the two devices is operating, the other thereof is in a standby state. If an abnormality occurs in the one device which is operating, the OLT 210 switches to the other device, so that a reliable system can be provided.

Accordingly, in the present invention, the dual lines are provided in order to reliably provide a broadcast signal output from the broadcasting transmission means 220.

The optical detection unit 230 detects the line from which an Internet data signal is output, from among the dual lines of the OLT 210.

Figure 3:
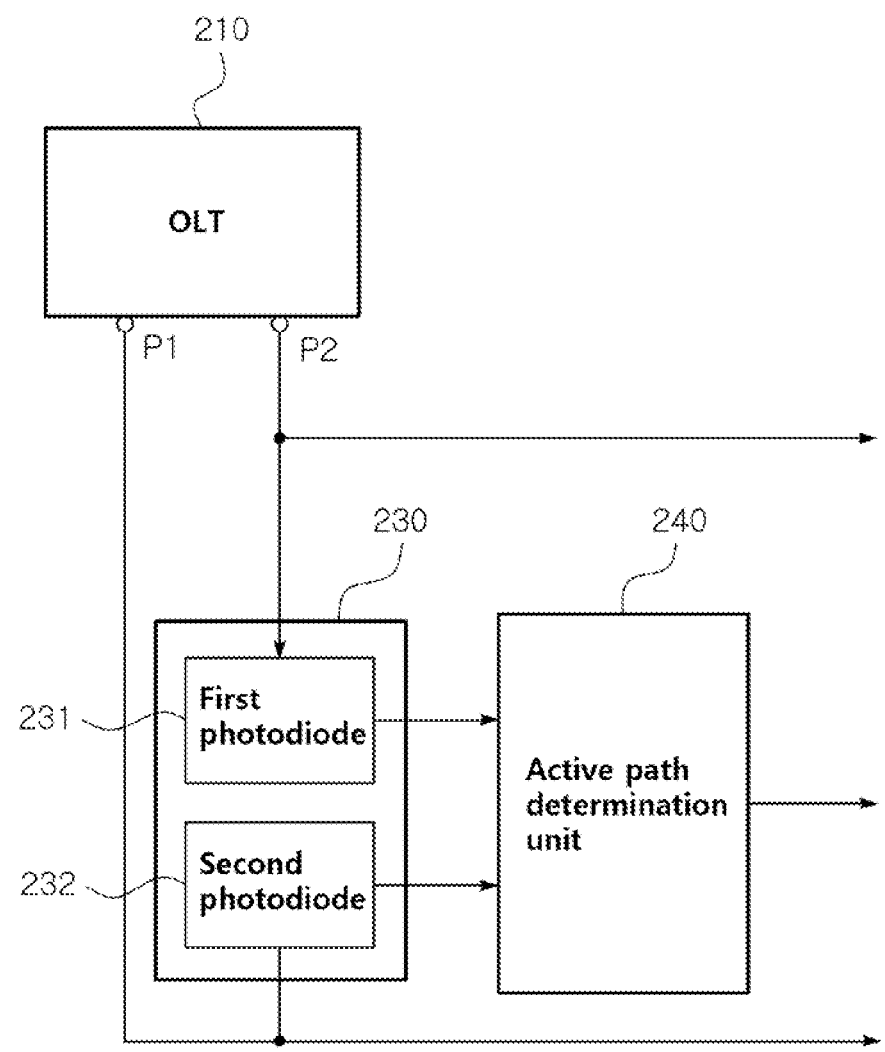
FIG. 3 is a schematic diagram showing the configuration of an optical detection unit according to the present invention.

FIG. 3 is a schematic diagram showing the configuration of the optical detection unit 230 according to the present invention. As shown in FIG. 3, the optical detection unit 230 includes a first photodiode 231 and a second photodiode 232. The first photodiode 231 and the second photodiode 232 are connected to the respective dual lines of the OLT 210, and receive and detect the light of a line from which an Internet data signal is output. That is, the first photodiode 231 and the second photodiode 232, which can receive the light of the Internet data signal output as an optical signal from one of the dual lines, are provided and detect the active path when the first photodiode 231 or the second photodiode 232 receives the light.

The active path determination unit 240 determines that the line detected by the optical detection unit 230 is an active path, and outputs a switching control signal.

The optical switch unit 250 receives an optical signal from the broadcasting transmission means 220, switches to the active path in response to the switching control signal from the active path determination unit 240, and outputs an optical signal.

The combining unit 260 receives the optical signal from the optical switch unit 250 and the Internet data signal from the OLT 210, multiplexes the optical signal and the Internet data signal, and outputs a multiplexed signal.

More specifically, the combining unit 260 includes a first MUX 261 and a second MUX 262. The first MUX 261 and the second MUX 262 are connected to the respective dual lines of the OLT 210. The first MUX 261 or the second MUX 262 connected to a line determined to be an active path receives the Internet data signal and the optical signal, multiplexes the Internet data signal and the optical signal, and outputs a multiplexed signal.

Figure 4:
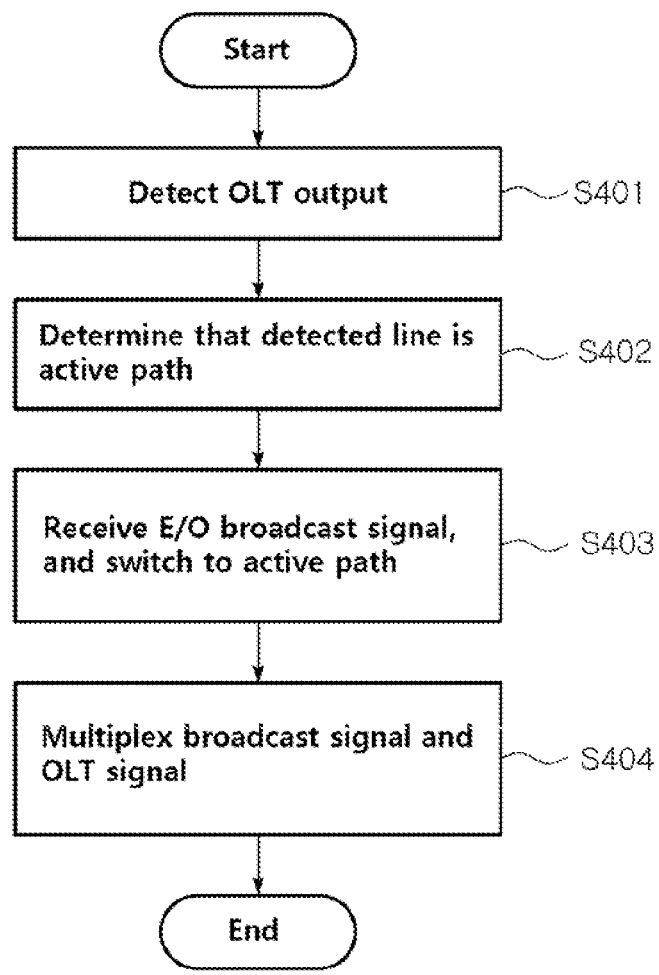
FIG. 4 is a flowchart illustrating a combined communication and broadcasting dual switching method according to the present invention.

FIG. 4 is a flowchart illustrating a combined communication and broadcasting dual switching method according to the present invention. As shown in FIG. 4, first, a line from which an Internet data signal is output is detected from among the dual lines of the OLT 210 at step S401. Here, the line from which the Internet data signal is output is detected by detecting light using a photodiode.

More specifically, the first photodiode 231 and the second photodiode 232 are connected to the respective dual lines of the OLT 210, and receive and detect the light of a line from which an Internet data signal is output. That is, the first photodiode 231 and the second photodiode 232, which can receive the light of the Internet data signal output as an optical signal from one of the dual lines, are provided and detect the active path when the first photodiode 231 or the second photodiode 232 receives the light.

Thereafter, the active path determination unit 240 determines that the detected line is the active path and outputs a switching control signal so that the active path can be switched to at step S402.

Thereafter, the optical switch unit 250 receives the broadcast signal, switches to the active path in response to the switching control signal and outputs a broadcast signal at step S403.

More specifically, the broadcast signal includes a satellite broadcast signal and a CATV broadcast signal. It is preferred that the broadcast signal include all types of service broadcast signals, such as a satellite broadcast, a CATV broadcast and a VOD broadcast. The broadcast signal occupies a different frequency band depending on the served broadcast signal. An RF broadcast signal in the frequency band of each broadcast signal is filtered, the filtered signal is amplified, and the amplified signal is output. Furthermore, the optical detection unit 230 converts the RF-amplified signal from an electrical signal to an optical signal, and outputs the optical signal.

Thereafter, the combining unit 260 receives the broadcast signal and the Internet data signal, multiplexes the broadcast signal and the Internet data signal, and outputs the multiplexed signal at step S404.

More specifically, the first MUX 261 and the second MUX 262 are connected to the respective dual lines of the OLT 210. The first MUX 261 or the second MUX 262 connected to the line of the active path receives the Internet data signal and the optical signal output after having been switched, multiplexes the Internet data signal and the optical signal, and outputs the multiplexed signal. That is, the first MUX 261 and the second MUX 262 have a dual configuration for performing Lhe output of a broadcast signal, and perform dual switching in response to the active path of the OLT 210.

Accordingly, the broadcast signal output from the broadcasting transmission means 220 is switched in a dual manner. The combined signal of the broadcast signal and the Internet data signal can be more reliably provided.

Although the specific embodiments of the present invention and various functional elements thereof have been described, it is to be understood that the present invention may be implemented using hardware, software, firmware, middleware, or a combination thereof. When the present invention is implemented by software, the elements of the present invention are instructions or code segments which perform necessary tasks. A program or the code segments may be stored in a machine-readable medium such as a processor-readable medium or in a computer program product, or may be transmitted over a transmission medium or a communication link in the form of a computer data signal embodied as carrier waves or in the form of a signal modulated by a carrier. The machine-readable medium or the processor-readable medium may include a specific medium which is capable of storing or sending information in a form which is readable or executable by a machine (e.g., a processor or a computer).

As described above, in accordance with the present invention, the dual lines are configured between the OLT and the broadcasting transmission means, and an optically converted broadcast signal may be automatically switched to the active path of the OLT and then output therethrough.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A combined communication and broadcasting dual switching system, comprising:
   broadcasting transmission means configured to convert a Radio Frequency (RF) broadcast signal into an optical signal, and to output the optical signal;
   an Optical Line Terminal (OLT) configured to comprise dual lines, and selectively output an Internet data signal;
   an optical detection unit configured to detect a line from which the Internet data signal is being output, from among the dual lines of the OLT;
   an active path determination unit configured to determine that the line, detected by the optical detection unit, is an active path, and output a switching control signal;
   an optical switch unit configured to receive the optical signal from the broadcasting transmission means, and switch to the active path in response to the switching control signal output from the active path determination unit; and
   a combining unit configured to receive the optical signal output after having been switched by the optical switch unit, receive the Internet data signal from the OLT, multiplex the received optical signal and the received Internet data signal, and output a multiplexed signal.

2. The combined communication and broadcasting dual switching system as set forth in claim 1, wherein the optical detection unit comprises a first photodiode and a second photodiode.

3. The combined communication and broadcasting dual switching system as set forth in claim 2, wherein the first photodiode and the second photodiode are connected to the respective dual lines of the OLT, and detect the line from which the Internet data signal is being output by receiving light of the line from which the Internet data signal is being output.

4. The combined communication and broadcasting dual switching system as set forth in claim 1, wherein the broadcasting transmission means comprises:

an RF amplification unit for amplifying the RF broadcast signal based on a frequency band and outputting the amplified RF signal; and
an Electrical to Optical (E/O) conversion unit for converting the RF signal of the RF amplification unit into the optical signal.

5. The combined communication and broadcasting dual switching system as set forth in claim 1, wherein the combining unit comprises a first multiplexer (MUX) and a second MUX.

6. The combined communication and broadcasting dual switching system as set forth in claim 5, wherein:
   the first MUX and the second MUX are connected to the respective dual lines of the OLT; and
   the first MUX or the second MUX connected to the line of the active path receives the Internet data signal and the optical signal output after having been switched, multiplexes the Internet data signal and the optical signal, and outputs the multiplexed signal.

7. The combined communication and broadcasting dual switching system as set forth in claim 1, wherein the RF broadcast signal comprises a satellite broadcast signal and a CATV broadcast signal.

8. The combined communication and broadcasting dual switching system as set forth in claim 1, wherein the Internet data signal output from the dual lines of the OLT is selectively output in response to a dual switching control signal.

9. A combined communication and broadcasting dual switching method, comprising:
   detecting a line from which an Internet data signal is being output, from among dual lines of an Optical Line Terminal (OLT);
   determining that the detected line is an active path, and outputting a switching control signal;
   receiving a broadcast signal, switching to the active path in response to the switching control signal, and outputting a broadcast signal; and
   receiving the broadcast signal and the Internet data signal, multiplexing the broadcast signal and the Internet data signal, and outputting the multiplexed signal.

10. The combined communication and broadcasting dual switching method as set forth in claim 9, wherein the detecting a line from which an Internet data signal is being output comprises detecting light using a photodiode.

11. The combined communication and broadcasting dual switching method as set forth in claim 9, wherein the broadcast signal is output as an optical signal which is obtained by performing E/O conversion on an RF-amplified signal.

12. The combined communication and broadcasting dual switching method as set forth in claim 9, wherein the broadcast signal comprises a satellite broadcast signal and a CATV broadcast signal.

13. The combined communication and broadcasting, dual switching method as set forth in claim 11, wherein the broadcast signal comprises a satellite broadcast signal and a CATV broadcast signal.

* * * * *